United States Patent
Li et al.

(10) Patent No.: US 8,321,517 B2
(45) Date of Patent: Nov. 27, 2012

(54) METHOD AND SYSTEM FOR PROCESSING EMAILS

(75) Inventors: Jing Li, Beijing (CN); Lin Xie, Beijing (CN); Shi Jia Zhang, Beijing (CN); Xiao Jin Zhao, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 111 days.

(21) Appl. No.: 12/771,102

(22) Filed: Apr. 30, 2010

(65) Prior Publication Data

US 2010/0281122 A1   Nov. 4, 2010

(30) Foreign Application Priority Data

Apr. 30, 2009   (CN) .......................... 2009 1 0136967

(51) Int. Cl.
*G06F 15/16* (2006.01)
(52) U.S. Cl. ............. 709/206; 709/207; 705/39; 705/44
(58) Field of Classification Search ........... 709/206–207
See application file for complete search history.

(56) References Cited

U.S. PATENT DOCUMENTS

| | | | |
|---|---|---|---|
| 7,844,546 B2 * | 11/2010 | Fleishman et al. | 705/39 |
| 2007/0106731 A1 * | 5/2007 | Bhakta et al. | 709/206 |
| 2007/0124394 A1 * | 5/2007 | Farrell et al. | 709/206 |
| 2007/0250588 A1 * | 10/2007 | Hogan et al. | 709/206 |
| 2008/0040432 A1 * | 2/2008 | Murphy et al. | 709/206 |
| 2009/0157828 A1 * | 6/2009 | Agrawal | 709/206 |
| 2009/0307271 A1 * | 12/2009 | Essenmacher et al. | 707/200 |
| 2009/0307315 A1 * | 12/2009 | Murphy et al. | 709/206 |

* cited by examiner

*Primary Examiner* — Hua Fan
(74) *Attorney, Agent, or Firm* — Patents on Demand. P.A.; Brian K. Buchheit; Scott M. Garrett

(57) ABSTRACT

The present invention provides a method and system for processing emails. The method comprising: receiving a correction request including an identifier of an original email and an incorrect recipient; in response to the correction request, creating a correction record including the identifier of the original email and the incorrect recipient; in response to receiving relevant emails of the original email, determining whether recipients of the relevant emails include the incorrect recipient; and in response to determining that recipients of the relevant emails include the incorrect recipient, processing the relevant emails based on the correction record.

20 Claims, 4 Drawing Sheets

400

410 Correction request receiving module

420 Correction record creation module

430 Email recipient determining module

440 Processing module

METHOD AND SYSTEM FOR PROCESSING EMAILS

CROSS-REFERENCE TO RELATED APPLICATIONS

This application claims the benefit of Chinese Patent Application No. 200910136967.1 filed 30 Apr. 2009 which is assigned to the assignee of the present application, and the teachings of which are hereby incorporated by reference in their entirety.

BACKGROUND

The present invention relates to information processing technology, more particularly, to a method and system for processing emails. Over the past twenty years, as the rapid development of electronic technology, computer network, especially the performance and capacity of internet, has an explosive growth. Users on the network receive and send millions of emails daily through computer network to perform commercial interaction or inter-person interaction for recreational purposes. In fact, email has become an extremely popular interaction channel for people to exchange information. For large companies that implement electronic office, the employees of which will receive/send large numbers of emails every day. Some employees' work even relies on email, or relies on the interaction in the manner of emails, or relies on the arrangement and repeatedly utilization of information in a great number of emails.

Due to several reasons, in the commercial field, such as within some companies, there often involves organizing and participating in a discussion targeted at a specific subject through email. In this case, for a received email, user often needs to make comment on content involved in that email subject and correspondingly reply or forward that email. In addition, for these replied or forwarded emails that targeted at same email subject, the recipients of which can make successive reply or forward. These multiple emails that related to a same email subject forms an email thread.

For some users, information in these emails sometimes includes certain time sensitive information. These time sensitive information need to be delivered to target recipient in time, so that the recipient can learn the situation or issue his/her opinion on that email subject. However, in an email system such as that of a large scale company, there are a lot of users with very similar email address. Thus, due to input error, a sender may incorrectly send an email whose target recipient is one user to another incorrect recipient. In the prior art, the incorrect recipient generally corrects this error manually. For instance, the incorrect recipient will notify the sender of the incorrectly sent email or forward the incorrectly sent email to possible target recipients. However, if the incorrectly sent email involves a user in the above email thread, then this error may diffuse in that thread and it may be incorrectly sent to the incorrect recipient again when multiple users are replying or forwarding relevant emails. Then, the target user cannot receive the email in time and could not learn the content therein and thus could not make comment on content involved in that email subject and correspondingly reply or forward that email. This would bring trouble to the target user that has not received the email in time. Also, it will cause trouble to the incorrect recipient, since he/she will constantly receive incorrectly sent email. For this reason, server side software and/or client side software for email has provided a plurality of manners for managing emails. For example, a user can prohibit an unauthorized user from sending emails to him.

Therefore, there is a need to improve email system to effectively manage these emails, so as to avoid incorrectly send relevant emails multiple times, so that information in emails can be processed in time.

BRIEF SUMMARY

In view of the deficiencies in prior art, the present invention provides a method for processing emails, comprising: receiving a correction request including an identifier of an original email and an incorrect recipient; in response to the correction request, creating a correction record including the identifier of the original email and the incorrect recipient; in response to receiving relevant emails of the original email, determining whether recipients of the relevant emails include the incorrect recipient; and in response to determining that recipients of the relevant emails include the incorrect recipient, processing the relevant emails based on the correction record.

The present invention also provides a system for processing emails, comprising: a correction request receiving module for receiving a correction request including an identifier of an original email and an incorrect recipient; a correction record creation module for, in response to the correction request, creating a correction record including the identifier of the original email and the incorrect recipient; an email recipient determining module for, in response to receiving relevant emails of the original email, determining whether recipients of the relevant emails include the incorrect recipient; and a processing module for, in response to determining that recipients of the relevant emails include the incorrect recipient, processing the relevant emails based on the correction record.

When a user finds an error in email address, the above method and system for processing emails according to the present invention can generate a correction record based on a correction request and process relevant emails in time. Thus, incorrectly sending relevant emails multiple times can be avoided.

DETAILED DESCRIPTION

Figure 1:
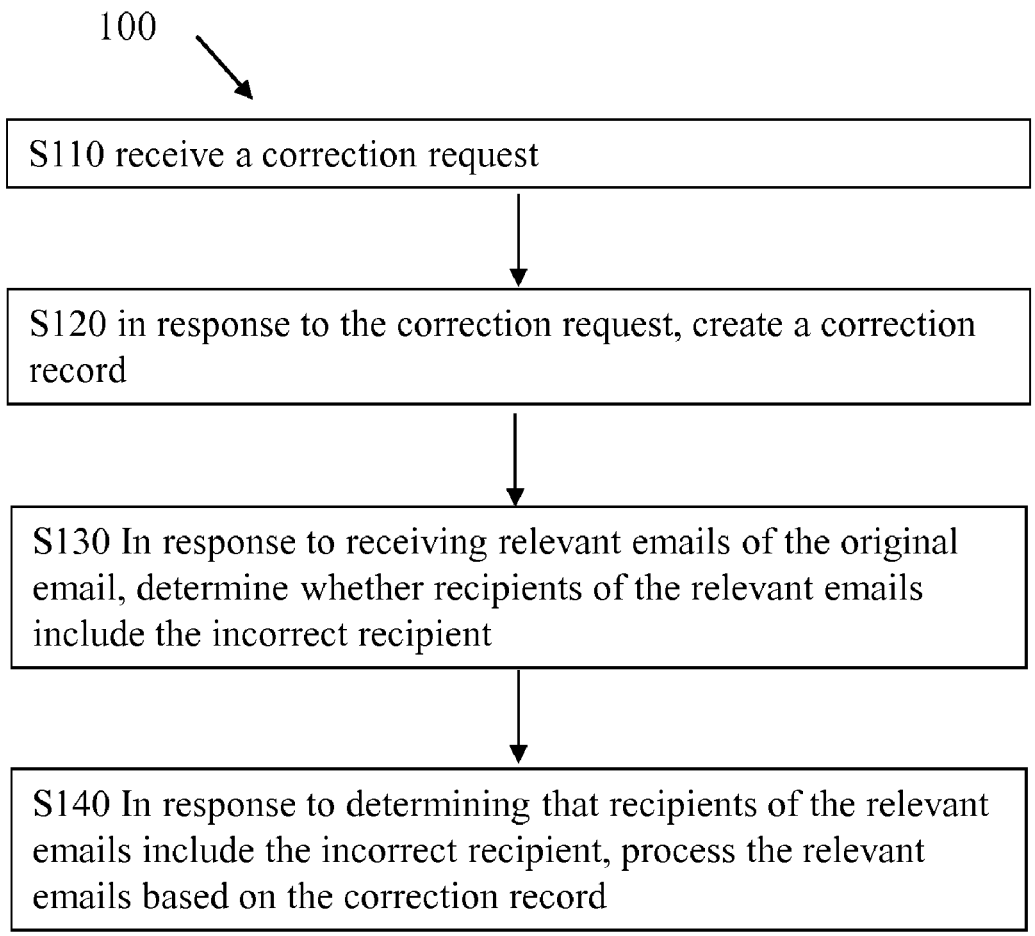
FIG. 1 is a flowchart illustrating a method for processing emails according to an embodiment of the invention.

As will be appreciated by one skilled in the art, the present invention may be embodied as a system, method or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in any tangible medium of expression having computer usable program code embodied in the medium.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, or device. The computer read label medium can be a non-transitory medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, or a magnetic storage device.

Computer program code for carrying out operations of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

FIG. 1 is a flowchart illustrating a method for processing emails according to an embodiment of the invention. As mentioned above, due to several reasons, there often involves organizing and participating in a discussion targeted at a specific subject through email. For example, a user can edit and send email for specific subject to multiple recipients. However, due to input error, a target recipient's email address is input as an incorrect recipient's email address. For this received email, other recipients often need to make comment on content involved in that email subject and correspondingly reply or forward that email. These multiple emails that related to a same email subject forms an email thread. In this process, a user in the email thread may find that error. To prevent the error from further diffusing in this thread, the method shown in FIG. 1 can be employed. The method is adapted to be performed in a mail server, especially adapted to be performed in a company's internal mail server. Those skilled in the art can also appreciate that the method is also adapted to be performed at incorrect recipient's email client or sender's email client.

In the method for processing emails shown in FIG. 1, at step S110, a correction request is received which includes an identifier of an original email and an incorrect recipient. Wherein, the correction request can further include a correct recipient. The correction request may come from another recipient, the incorrect recipient or sender of the original mail that targeted at that subject.

Common email generally complies with two protocols: POP3 protocol and MIME protocol. The full name of POP3 is "Post Office Protocol—Version 3", which is a member of TCP/IP protocol family, this protocol is mainly used by mail server to communicate with client so as to send emails. The full name of MIME protocol is "Multipurpose Internet Mail Extensions", which is an internet standard and is used to format mail content.

The content of the mail sent to a mail server or downloaded therefrom is in MIME format, which includes mail header and mail body. The obtained subject string of the email is a portion of mail header and is labeled with "subject" field. The following is a full mail in MIME format, and string "Beijing XXX Team Weekly Report by Dec. 14, 2007" after Subject can be obtained.

---

Received: by 10.86.66.1 with HTTP; Mon, 6 Oct 2008 00:40:42 -0700 (PDT)
Message-ID:
<fc3121650810060040o749ec1c21afc7a416d06afd6a@mail.xxx.com>
Date: Mon, 6 Oct 2008 15:40:42 +0800
From: "=?GB2312?B?1r6yqNfz?=" <xxy@xxx.com>
To: xxx@xxx.com
CC: yyy@yyy.com
Subject: Beijing XXX Team Weekly Report by 12/14/2007
MIME-Version: 1.0
Content-Type: multipart/alternative;
    boundary="----=_Part_6548_1407620.1223278842520"
Delivered-To: xxx@xxx.com
------=_Part_6548_1407620.1223278842520
Content-Type: text/plain; charset=ISO-8859-1
Content-Transfer-Encoding: 7bit
Content-Disposition: inline
this is a test mail.

---

Some special characters will be contained in subject of replied or forwarded email, for example, string in Subject will contain special flag character like "Re:", "FW:". An email is sent simultaneously to an American and a Chinese. The American will use "Re:" when replying with English mail client software, while the Chinese use Chinese mail client software and will use "回复:" when replying.

MIME includes mail header and mail body. The obtained recipient is a part of mail header and is labeled with "To" and string of "To" field can be obtained therefrom. The information of sender and people to which a copy of the mail is sent can also be obtained from "From" and "CC" field. Wherein, "=?GB2312?B?1r6yqNfz?=" represents name of the sender which is encoded in GB2312. xxy@xxx.com represents sender's email address. xxx@xxx.com represents recipient's email address, yyy@yyy.com represents email address of people to which a copy of the mail is sent.

When generating an original email, mail system can also generate a unique email thread identifier for that original email. When a recipient of that email is replying or forwarding that email, the replied or forwarded email can include the email thread identifier. Thus, it can be identified that the replied or forwarded email and the original email belong to a same email thread.

Those skilled in the art can appreciate that the identifier of the original email may be subject of original email, email thread identifier of original email, or may be other identifiers, if needed.

According to another embodiment of the invention, the correction request can also carry original email, user received original email. For example, the identifier of original email in the correction request can employ subject of the original email. In this case, the correction request can carry original email or user received original email therein, so as to further determine relevant email of the original email.

At step S120, in response to the correction request, a correction record is created which includes the identifier of the original email and the incorrect recipient. Wherein, if the correction request includes a correct recipient, then the correction record can further include the correct recipient. If the correction request does not include a correct recipient, the method can further include: send the correction record to sender of the original email; and receive from the sender of the original email correct recipient for replacing the incorrect recipient.

The correction record can be used by mail server or email client to process further received relevant email of the original email. For example, the incorrect recipient of email relevant to the subject can be replaced with the correct recipient.

At step S130, in response to receiving relevant emails of the original email, it is determined whether recipients of the relevant emails include the incorrect recipient. Wherein, the relevant emails of the original email may be direct forward, indirect forward, direct reply or indirect reply to the original email.

Wherein, the identifier of the original email may be an email thread identifier of the original email. The relevant emails and the original email may belong to a same email thread. The relevant emails can be determined based on whether the directly forwarded, indirectly forwarded, directly replied or indirectly replied email includes the email thread identifier of the original email.

In case that subject of email is used as an identifier, after obtaining subject of the email, content after special characters in subject string can also be checked, such as content after "Re:", "FW:", "Re:FW:", "Re:Re:" or "FW:Re:" etc. within string in the subject, so as to determine if it is relevant email targeted at the email subject, i.e., if it is relevant email of the original email. "To" and "CC" fields of the email may be further checked to determine if they contain one or more recipients corresponding to the original email, so as to further determine whether the email is relevant email targeted at the email subject.

Whether recipients of the relevant emails include the incorrect recipient can be determined by checking string of "To" and "CC" fields in the email to obtain address information of recipient and people to which a copy of the mail is sent; then comparing the address information of recipient and people to which a copy of the mail is sent with that of the incorrect recipient.

At step S140, in response to determining that recipients of the relevant emails include the incorrect recipient, the relevant emails are processed based on the correction record.

Wherein, when the above method is performed at mail server or incorrect recipient's client, process the relevant emails based on the correction record can comprise: send information related to the relevant emails to the correct recipient or sender of the relevant emails based on the correction record. Thus, the correct recipient or sender of the relevant emails can take corresponding remedy measure. For example, information about the subject and sender of the relevant emails can be send to the correct recipient, the correct recipient can request the sender to resend the relevant emails.

Process the relevant emails based on the correction record can also be configured to send a notification to sender of the relevant emails, notifying that there may be an error in recipient of the email. Thus, these senders can make corresponding check and remedy.

When the above method is performed at incorrect recipient's client, the incorrect recipient can be set to not receive email of the thread. For example, it can be set to directly reject the relevant email targeted at the email subject. Thus, the corresponding sender can receive returned mail and take appropriate remedy measure. When the above method is performed at mail server, it can be set in the correction request by the incorrect recipient to directly reject receiving relevant email targeted at the email subject.

Thus, process the relevant emails based on the correction record may comprise return the relevant emails back to sender on behalf of the incorrect recipient. The incorrect recipient can then be free of repeatedly processing incorrectly sent emails within same email thread.

Process the relevant emails based on the correction record may be further configured to: replace the incorrect recipient in the relevant emails with the correct recipient based on the correction record; and send the relevant emails to the correct recipient. Thus, incorrectly sending of relevant emails can be corrected in time to avoid further possibility of incorrectly sending of relevant emails.

In case that the incorrect recipient is replaced with the correct recipient, in the relevant emails sent to the correct recipient, it can be identified that recipient is modified from the incorrect recipient to the correct recipient. Thus, for correction that should not be performed, remedy reminder can be provided. For such email, recipient can be further reminded of remedy measure he could take if he is not the intended recipient of that email.

Figure 2:
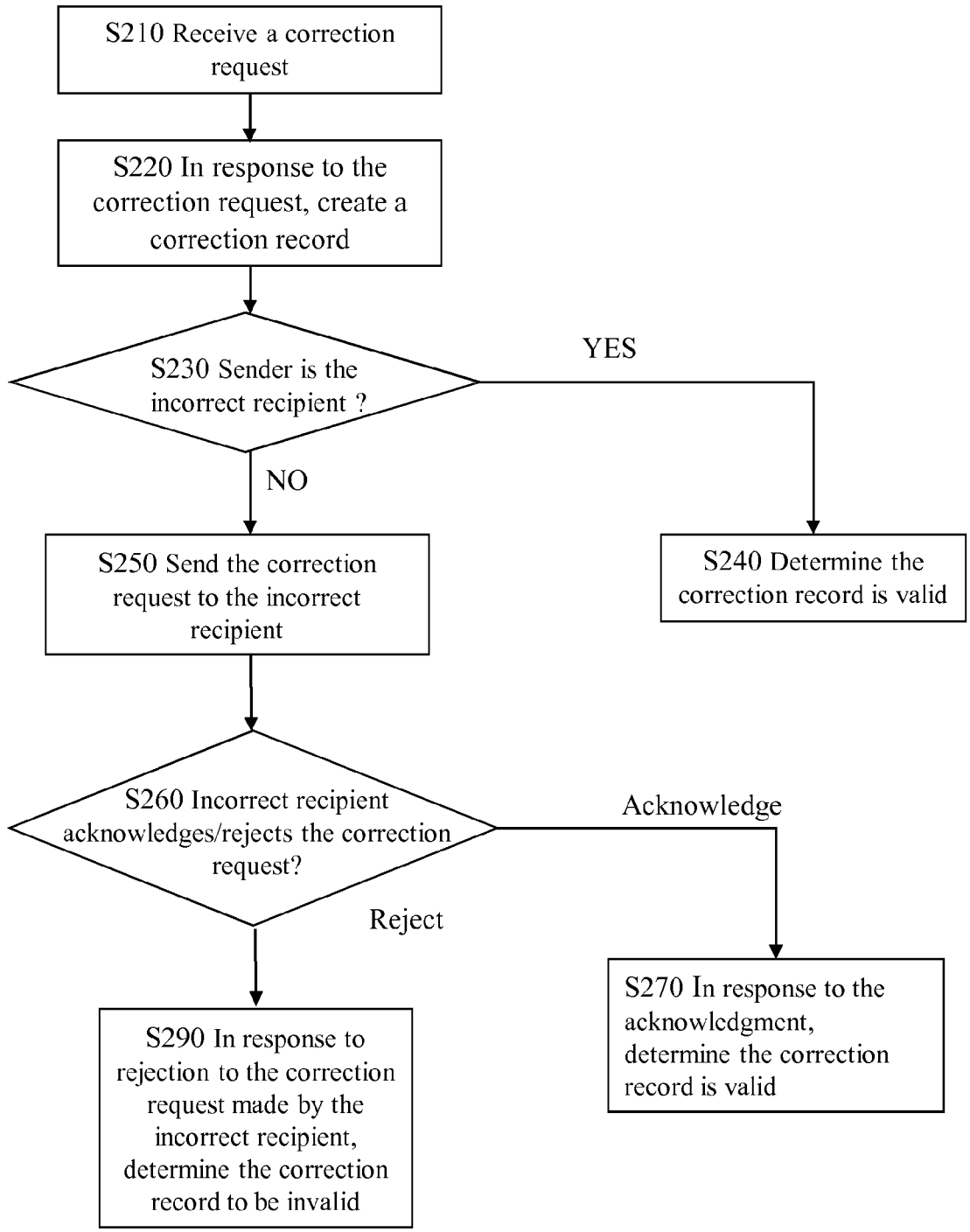
FIG. 2 is a flowchart for determining whether a correction record is valid according to another embodiment of the invention.

FIG. 2 is a flowchart for determining whether a correction record is valid according to another embodiment of the invention. Wherein, at step S210, a correction request is received, which includes an identifier of an original email and an incorrect recipient. Wherein, the correction request may further include a correct recipient. The correction request may come from another recipient, the incorrect recipient or sender of the original mail. At step S220, in response to the correction request, a correction record is created which includes the identifier of the original email and the incorrect recipient. Wherein, if the correction request includes a correct recipient, then the correction record can further include the correct recipient. If the correction request does not include a correct recipient, the method can further include: send the correction record to sender of the original email; and receive from the sender of the original email correct recipient for replacing the incorrect recipient. At step S230, it is determined whether sender of the correction request is the incorrect recipient. This can be determined by checking sender field of the correction request. In addition, sender information can also be expressed in the correction request. At step S240, in response to determining that sender of the correction request is the incorrect recipient, the correction record is determined to be valid. A recipient may often receive email whose intended recipient is another user; that recipient has relatively definite reason that his correction request is correct.

Wherein, sender of the correction request may be sender of the original email targeted at one subject. At step S250, in response to determining that sender of the correction request is not the incorrect recipient, the correction request is sent to the incorrect recipient. At step S260, acknowledgment to the correction request made by the incorrect recipient is received. At step S270, in response to the acknowledgment to the correction request made by the incorrect recipient, the correction record is determined to be valid.

Rejection to the correction request can be sent back if the incorrect recipient considers that the correction request is inappropriate. At step S290, in response to the rejection to the correction request made by the incorrect recipient, the correction record is determined to be invalid.

In addition, if acknowledgment to the correction request made by the incorrect recipient is not received, then the correction record may be determined as to be valid. It can be set that if acknowledgment to the correction request made by the incorrect recipient is not received after a pre-specified time, then the correction record may be determined as to be valid. The correction record can also be determined as to be valid when it is generated, then its status is updated based on the above process.

Those skilled in the art can appreciate that for the case that the correction record is to be valid and the case in step S290, other manner of processing correction record and/or appropriate remedy measure can also be taken. For example, for the case that the correction record is determined as invalid or to be valid, process the relevant email based on the correction record can be merely set to send a notification to sender of the relevant emails, notifying that there may be an error in recipient of the email. Thus, these senders can make corresponding check and remedy.

Figure 3:
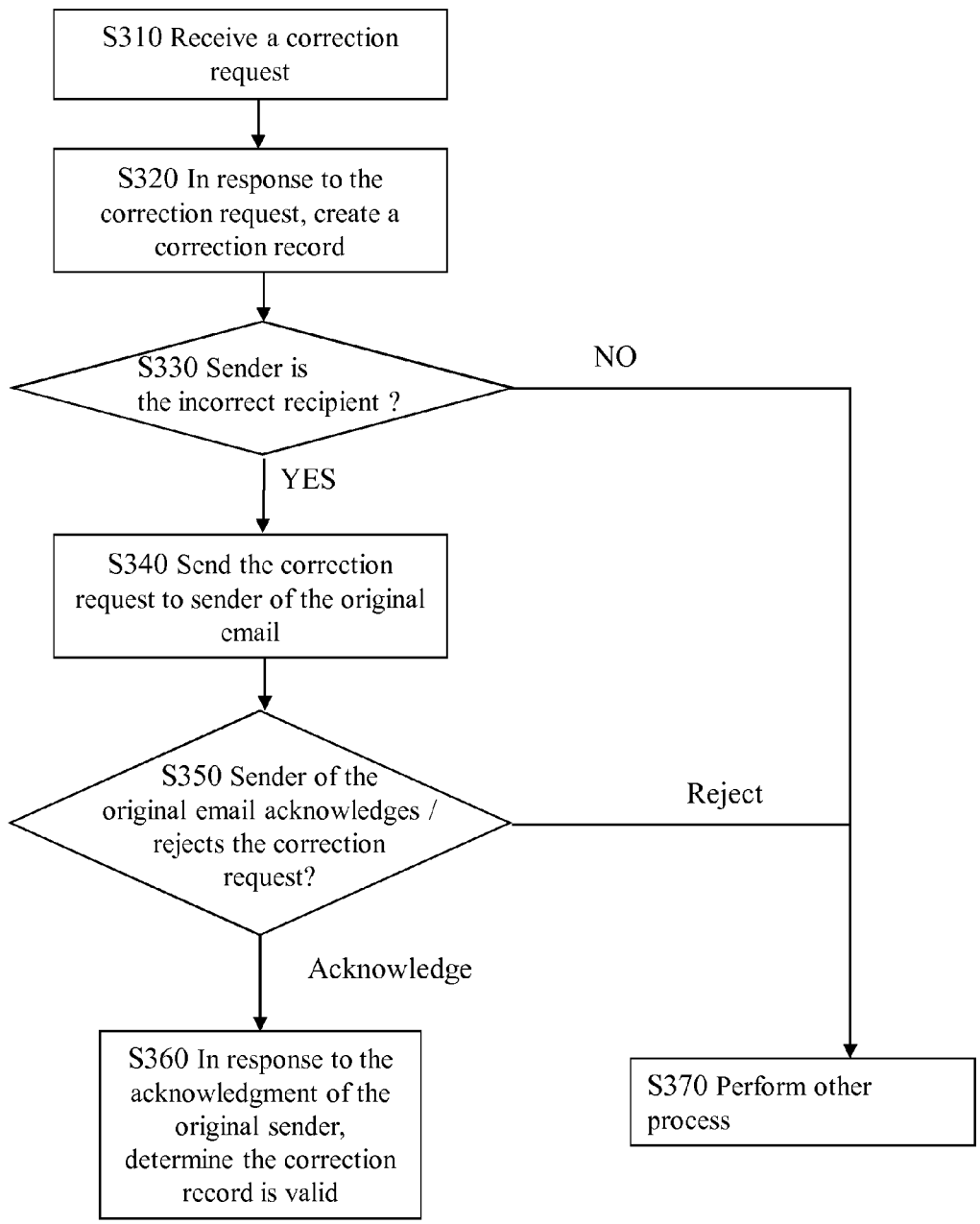
FIG. 3 is a flowchart for determining whether a correction record is valid according to another embodiment of the invention.

FIG. 3 is a flowchart for determining whether a correction record is valid according to another embodiment of the invention. At step S310, a correction request is received, which includes an identifier of an original email and an incorrect recipient. Wherein, the correction request may further include a correct recipient. The correction request may come from another recipient, the incorrect recipient or sender of the original mail. At step S320, in response to the correction request, a correction record is created which includes the identifier of the original email and the incorrect recipient. Wherein, if the correction request includes a correct recipient, then the correction record can further include the correct recipient. If the correction request does not include a correct recipient, the method can further include: send the correction record to sender of the original email; and receive from the sender of the original email correct recipient for replacing the incorrect recipient. At step S330, it is determined whether sender of the correction request is the incorrect recipient. This can be determined by checking sender field of the correction request. In addition, sender information can also be expressed in the correction request.

At step S340, in response to determining that sender of the correction request is the incorrect recipient, the correction request is sent to sender of the original email. If sender of the correction request is not the incorrect recipient, the method proceeds to step S370 to perform other process.

At step S350, acknowledgment or rejection to the correction request made by the sender of the original email is received. At step S360, in response to the acknowledgment of the original sender, the correction record is determined to be valid. If sender of the original email rejects the correction request, then the method proceeds to step S370 to perform other process.

As an alternative solution, step S340, S350 and S360 can also be configured to: in response to determining that sender of the correction request is the incorrect recipient, send the correction request to the sender of the relevant emails; receive acknowledgment to the correction request made by the sender of the relevant emails; and in response to the acknowledgment made by the sender of the relevant emails, determine the correction record as valid.

According to a further embodiment of the invention, wherein, process the relevant emails based on the correction record may further comprise: determine if the correction record is valid; in response to determining the correction record as valid, replace incorrect recipient in the relevant emails with the correct recipient based on the correction record; and send the relevant email to the correct recipient.

As mentioned above, in case that the incorrect recipient is replaced with the correct recipient, in the relevant emails sent to the correct recipient, it can be identified that recipient is modified from the incorrect recipient to the correct recipient. Thus, for correction that should not be performed, remedy reminder can be provided. For such email, recipient can be further reminded of remedy measure he could take if he is not the intended recipient of that email.

According to a further embodiment of the invention, if the incorrect recipient does not want to be further disturbed, in case that the correction record is determined as invalid, the relevant emails whose recipient is the incorrect recipient will not be sent to him based on the correction record according to request of the incorrect recipient. The relevant emails whose sender is relevant user (such as sender of the relevant emails) will also not be forwarded based on the correction record according to request of the relevant user.

According to a further embodiment of the invention, wherein, it may further comprise: send the correction record determined as valid to the sender of the original email. For example, the above correction record can be implemented through the following table or similar data structure.

| identifier of original email | correct recipient | incorrect recipient | requestor | valid |
| --- | --- | --- | --- | --- |

Based on information in the above table, the following table can be generated in client system of sender of original email.

| correct recipient | incorrect recipient | number of times | reminder |
| --- | --- | --- | --- |

When the incorrect recipient has been entered for a predefined times, client system of sender of original email may automatically generate a reminder to prevent error from occurring.

According to a further embodiment of the invention, recipient may be checked first and then subject of email will be checked to determine relevant emails targeted at the subject of the email. Subject of the mail may be directly checked to determine relevant emails, or it can be determined by content matching, such as the email filtering or identifying functions used by many mail servers.

Wherein, create the correction record may further comprise: extract from the correction request sender of the correction request, and the correction record includes the sender of the correction request. Process the relevant emails based on the correction record may be further configured to: if recipient of the relevant emails includes the sender of the correction request, then replace the incorrect recipient in the relevant emails with the correct recipient; and send the relevant emails to the correct recipient.

Figure 4:
FIG. 4 is a block diagram illustrating a system for processing emails according to another embodiment of the invention.

FIG. 4 is a block diagram illustrating a system for processing emails according to another embodiment of the invention. Wherein, the system 400 for processing emails comprises the following modules. A correction request receiving module 410 is used to receive a correction request including an identifier of an original email and an incorrect recipient. Wherein, the correction request may further include a correct recipient. A correction record creation module 420, which in response to the correction request, creates a correction record including the identifier of the original email and the incorrect recipient. Wherein, the correction request may further include a correct recipient, and the correction record may further include the correct recipient.

According to another embodiment, the system 400 may further comprise a correction record sending module for sending the correction record to sender of the original email; and a receiving module for receiving from the sender of the original email correct recipient for replacing the incorrect recipient.

An email recipient determining module 430, which in response to receiving relevant emails of the original email, determines whether recipients of the relevant emails include the incorrect recipient. A processing module 440, which in response to determining that recipients of the relevant emails include the incorrect recipient, processes the relevant emails based on the correction record.

Wherein, the identifier of the original email may be an email thread identifier of the original email; the relevant emails of the original email and the original email belong to a same email thread; the processing module 440 may be further configured to: send information related to the relevant emails to the correct recipient or sender of the relevant emails based on the correction record.

Wherein, the processing module 440 may be further configured to: replace the incorrect recipient in the relevant emails with the correct recipient; and send the relevant emails to the correct recipient.

Wherein, the processing module 440 may be further configured to: return the relevant emails back to sender of the relevant emails on behalf of the incorrect recipient. Wherein, the relevant emails of the original email are direct forward, indirect forward, direct reply or indirect reply to the original email.

The system 400 for processing emails may further comprise: a correction record determining module for determining if the correction record is valid. Wherein, the processing module 440 may be further configured to: in response to the correction record is determined to be valid, process the relevant emails based on the correction record.

In the system 400 for processing emails, wherein the correction record determining module may further comprise: a first correction request sender determining module for determining whether sender of the correction request is the incorrect recipient; and a first correction record setting module for, in response to determining that sender of the correction request is the incorrect recipient, determining that the correction record is valid. Wherein, the correction record determining module may further comprise: a first correction request forwarding module for, in response to determining that sender of the correction request is not the incorrect recipient, sending the correction request to the incorrect recipient; a first acknowledgment receiving module for receiving acknowledgment to the correction request made by the incorrect recipient; and the first correction record setting module is further configured to: in response to the acknowledgment, determine that the correction record is valid.

In the system 400 for processing emails, wherein the correction record determining module may further comprise: a second correction request sender determining module for determining whether sender of the correction request is the incorrect recipient; and a second correction request forwarding module for, in response to determining that sender of the correction request is the incorrect recipient, sending the correction request to the sender of the original email; a second acknowledgment receiving module for receiving acknowledgment to the correction request made by the sender of the original email; and a second correction record setting module for, in response to the acknowledgment to the correction request made by the sender of the original email, determining that the correction record is valid.

Wherein, the processing module 440 may be further configured to: in the relevant emails sent to the correct recipient, identify that recipient is modified from the incorrect recipient to the correct recipient.

The system 400 for processing emails may further comprise: a correction record sending module for sending the correction record determined to be valid to the sender of the original email.

The present invention also provides a storage media or signal carrier which includes therein instructions for performing the method according to the present invention. The storage media can be a tangible or non-transient storage media.

The flowchart and block diagrams in the FIGS. 1-4 illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The present invention has been described in connection with preferred implementation, however, it can be appreciated that the above embodiments are merely used to explain rather than limit the present invention. Those skilled in the art can modify the illustrated implementation of the invention without departing from the scope and spirit thereof.

The invention claimed is:

1. A method for processing emails, comprising:
   receiving a correction request including an identifier of an original email and an incorrect recipient;
   in response to the correction request, creating a correction record including the identifier of the original email and the incorrect recipient;
   in response to receiving relevant emails of the original email, determining whether recipients of the relevant emails include the incorrect recipient;
   in response to determining that a sender of the correction request is not the incorrect recipient, sending the correction request to the incorrect recipient;
   receiving from the incorrect recipient acknowledgment to the correction request;
   in response to receiving from the incorrect recipient the acknowledgment to the correction request, determining the correction record to be valid; and
   in response to determining that recipients of the relevant emails include the incorrect recipient and in response to determining the correction record to be valid, processing the relevant emails based on the correction record.

2. The method according to claim 1, wherein, the identifier of the original email is an email thread identifier of the original email; the relevant emails and the original email belong to a same email thread.

3. The method according to claim 1, wherein further comprising:
   sending the correction record to the sender of the original email; and
   receiving from the sender of the original email a correct recipient for replacing the incorrect recipient.

4. The method according to claim 1, wherein, the correction request further includes a correct recipient, and the correction record further includes the correct recipient.

5. The method according to claim 1, wherein processing the relevant emails based on the correction record comprising:
   sending information related to the relevant emails to a correct recipient or a sender of the relevant emails based on the correction record.

6. The method according to claim 1, wherein processing the relevant emails based on the correction record is further configured to:
   replace the incorrect recipient in the relevant emails with a correct recipient; and
   send the relevant emails to the correct recipient.

7. The method according to claim 6, wherein further comprising:
   in the relevant emails sent to the correct recipient, identifying that the incorrect recipient is modified to the correct recipient.

8. The method according to claim 1, wherein processing the relevant emails based on the correction record comprising:
   returning the relevant emails back to a sender of the relevant emails on behalf of a incorrect recipient, wherein the relevant emails are direct forward, indirect forward, direct reply or indirect reply to the original email, wherein the incorrect recipient is a user having a valid email address capable of receiving emails successfully.

9. The method according to claim 1, further comprising:
   determining if a sender of the correction request is the incorrect recipient; and
   in response to determining that the sender of the correction request is the incorrect recipient, determining the correction record to be valid, wherein the incorrect recipient is a user having a valid email address capable of receiving emails successfully.

10. A system for processing emails, comprising:
    one or more processors and one or more non-transitory computer readable mediums storing executable program instructions comprising:
    program instructions stored on the one or more non-transitory computer readable mediums for execution by at least one of the one or more processors to receive a correction request including an identifier of an original email and an incorrect recipient;
    program instructions stored on the one or more non-transitory computer readable mediums for execution by at least one of the one or more processors to, in response to the correction request, create a correction record including the identifier of the original email and the incorrect recipient;
    program instructions stored on the one or more non-transitory computer readable mediums for execution by at least one of the one or more processors to, in response to receiving relevant emails of the original email, determine whether recipients of the relevant emails include the incorrect recipient;
    program instructions stored on the one or more non-transitory computer readable mediums for execution by at least one of the one or more processors to, in response to determining that a sender of the correction request is not the incorrect recipient, sending the correction request to the incorrect recipient;
    program instructions stored on the one or more non-transitory computer readable mediums for execution by at least one of the one or more processors to receive from the incorrect recipient acknowledgment to the correction request;
    program instructions stored on the one or more non-transitory computer readable mediums for execution by at least one of the one or more processors to, in response to receiving from the incorrect recipient the acknowledgment to the correction request, determining the correction record to be valid; and
    program instructions stored on the one or more non-transitory computer readable mediums for execution by at least one of the one or more processors to, in response to determining that recipients of the relevant emails include the incorrect recipient and in response to determining the correction record to be valid, process the relevant emails based on the correction record.

11. The system according to claim 10, wherein, the identifier of the original email is an email thread identifier of the original email, and wherein the relevant emails of the original email and the original email belong to a same email thread.

12. The system according to claim 10, wherein further comprising:
    program instructions stored on the one or more non-transitory computer readable mediums for execution by at least one of the one or more processors to send the correction record to the sender of the original email; and
    program instructions stored on the one or more non-transitory computer readable mediums for execution by at least one of the one or more processors to receive from the sender of the original email a correct recipient for replacing the incorrect recipient.

13. The system according to claim 10, wherein, the correction request further includes a correct recipient, and the correction record further includes the correct recipient.

14. The system according to claim 10, further comprising:
program instructions stored on the one or more non-transitory computer readable mediums for execution by at least one of the one or more processors to send information related to the relevant emails to a correct recipient or a sender of the relevant emails based on the correction record.

15. The system according to claim 10, further comprising:
program instructions stored on the one or more non-transitory computer readable mediums for execution by at least one of the one or more processors to replace the incorrect recipient in the relevant emails with a correct recipient and identify that the incorrect recipient is modified to the correct recipient; and send the relevant emails to the correct recipient.

16. The system according to claim 10, further comprising:
program instructions stored on the one or more non-transitory computer readable mediums for execution by at least one of the one or more processors to return the relevant emails back to a sender of the relevant emails on behalf of the incorrect recipient;
wherein, the relevant emails of the original email are direct forward, indirect forward, direct reply or indirect reply to the original email, wherein the incorrect recipient is a user having a valid email address capable of receiving emails successfully.

17. A computer program product comprising a non-transitory computer readable medium having computer usable code embodied therewith, the computer usable code comprising:
computer usable program code stored in the non-transitory computer readable-medium that when executed by a processor causes the processor to receive a correction request including an identifier of an original email and an incorrect recipient;
computer usable program code stored in the non-transitory computer readable-medium that when executed by a processor causes the processor to, in response to the correction request, create a correction record including the identifier of the original email and the incorrect recipient;
computer usable program code stored in the non-transitory computer readable-medium that when executed by a processor causes the processor to, in response to receiving relevant emails of the original email, determine whether recipients of the relevant emails include the incorrect recipient; and
computer usable program code stored in the non-transitory computer readable medium that when executed by a processor causes the processor to, in response to determining that a sender of the correction request is not the incorrect recipient, sending the correction request to the incorrect recipient;
computer usable program code stored in the non-transitory computer readable medium that when executed by a processor causes the processor to receive from the incorrect recipient acknowledgment to the correction request;
computer usable program code stored in the non-transitory computer readable medium that when executed by a processor causes the processor to, in response to receiving from the incorrect recipient the acknowledgment to the correction request determining the correction record to be valid; and
computer usable program code stored in the non-transitory computer readable-medium that when executed by a processor causes the processor to, in response to determining that recipients of the relevant emails include the incorrect recipient and in response to determining the correction record to be valid, process the relevant emails based on the correction record.

18. The computer program product according to claim 17, wherein, the identifier of the original email is an email thread identifier of the original email; the relevant emails and the original email belong to a same email thread.

19. The computer program product according to claim 17, wherein, the correction request further includes a correct recipient, and the correction record further includes the correct recipient.

20. The computer program product according to claim 17, wherein the computer usable code further comprising:
computer usable program code stored in the non-transitory computer readable-medium that when executed by a processor causes the processor to replace the incorrect recipient in the relevant emails with a correct recipient; and
computer usable program code stored in the non-transitory computer readable-medium that when executed by a processor causes the processor to send the relevant emails to the correct recipient.

\* \* \* \* \*